(12) United States Patent
Schäfer

(10) Patent No.: US 7,735,625 B2
(45) Date of Patent: Jun. 15, 2010

(54) APPARATUS AND METHOD FOR UNLOADING TRAYS HAVING A PALLET LAYER LOADED

(75) Inventor: Gerhard Schäfer, Neunkirchen (DE)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 0 days.

(21) Appl. No.: 12/389,524

(22) Filed: Feb. 20, 2009

(65) Prior Publication Data

US 2009/0257860 A1 Oct. 15, 2009

Related U.S. Application Data

(63) Continuation of application No. PCT/EP2007/007352, filed on Aug. 21, 2007.

(30) Foreign Application Priority Data

Aug. 21, 2006 (DE) ........................ 10 2006 039 697

(51) Int. Cl.
*B65G 47/24* (2006.01)
(52) U.S. Cl. .............................. 198/370.09; 198/463.3; 198/782
(58) Field of Classification Search ................. 198/782, 198/463.3, 370.09; 193/35 SS
See application file for complete search history.

(56) References Cited

U.S. PATENT DOCUMENTS

| | | | |
|---|---|---|---|
| 1,660,327 A * | 2/1928 | Evans ........................... | 193/36 |
| 1,676,011 A * | 7/1928 | Evans ........................... | 193/36 |
| 3,675,801 A | 7/1972 | Larson | |
| 3,680,677 A * | 8/1972 | Branch et al. ............. | 198/369.6 |
| 3,983,988 A * | 10/1976 | Maxted et al. ......... | 198/370.09 |
| 5,145,049 A * | 9/1992 | McClurkin ................... | 198/374 |
| 5,297,924 A | 3/1994 | Neri | |
| 5,328,540 A * | 7/1994 | Clayton et al. ............... | 156/285 |
| 6,073,747 A * | 6/2000 | Takino et al. .......... | 198/370.09 |
| 6,373,017 B1 * | 4/2002 | Isoyama et al. ................ | 219/57 |
| 6,382,393 B2 * | 5/2002 | Itoh et al. .............. | 198/370.09 |
| 6,648,121 B2 * | 11/2003 | Freudelsperger ....... | 198/370.09 |
| 6,669,003 B2 * | 12/2003 | Vassel ......................... | 198/435 |
| 7,047,710 B2 | 5/2006 | Winkler | |
| 2003/0221932 A1 * | 12/2003 | Costanzo ............... | 193/35 MD |

FOREIGN PATENT DOCUMENTS

| DE | 44 12 276 A1 | 10/1995 |
|---|---|---|
| DE | 101 27 778 A1 | 12/2002 |
| WO | WO 03/064293 A1 | 8/2003 |

* cited by examiner

*Primary Examiner*—Mark A Deuble
(74) *Attorney, Agent, or Firm*—McNeely & Hare LLP; Kevin J. McNeely

(57) ABSTRACT

An apparatus and method for unloading a load support, particularly a tray, which can be loaded with at least one packing unit, particularly with a pallet layer of packing units, includes a roller array comprising a plurality of driven rollers, and having a size which corresponds substantially to a size of a loading area of the load support; and a lifting mechanism lifting the roller array or lowering the load support such that the rollers engage through holes within the loading area of the load support, in order to remove from the loading area a packing unit, preferably in a desired manner, by driving the rollers.

23 Claims, 9 Drawing Sheets

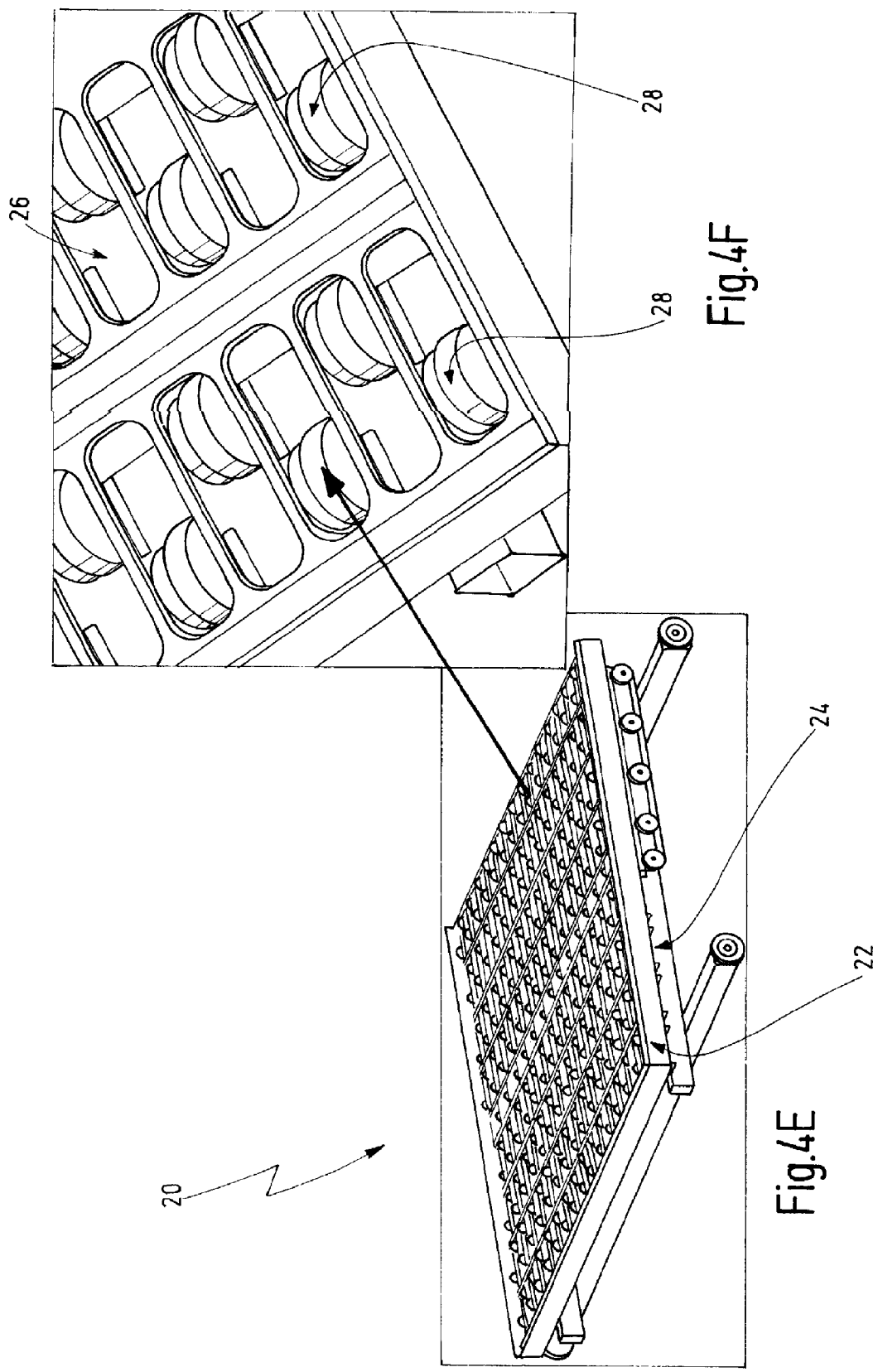

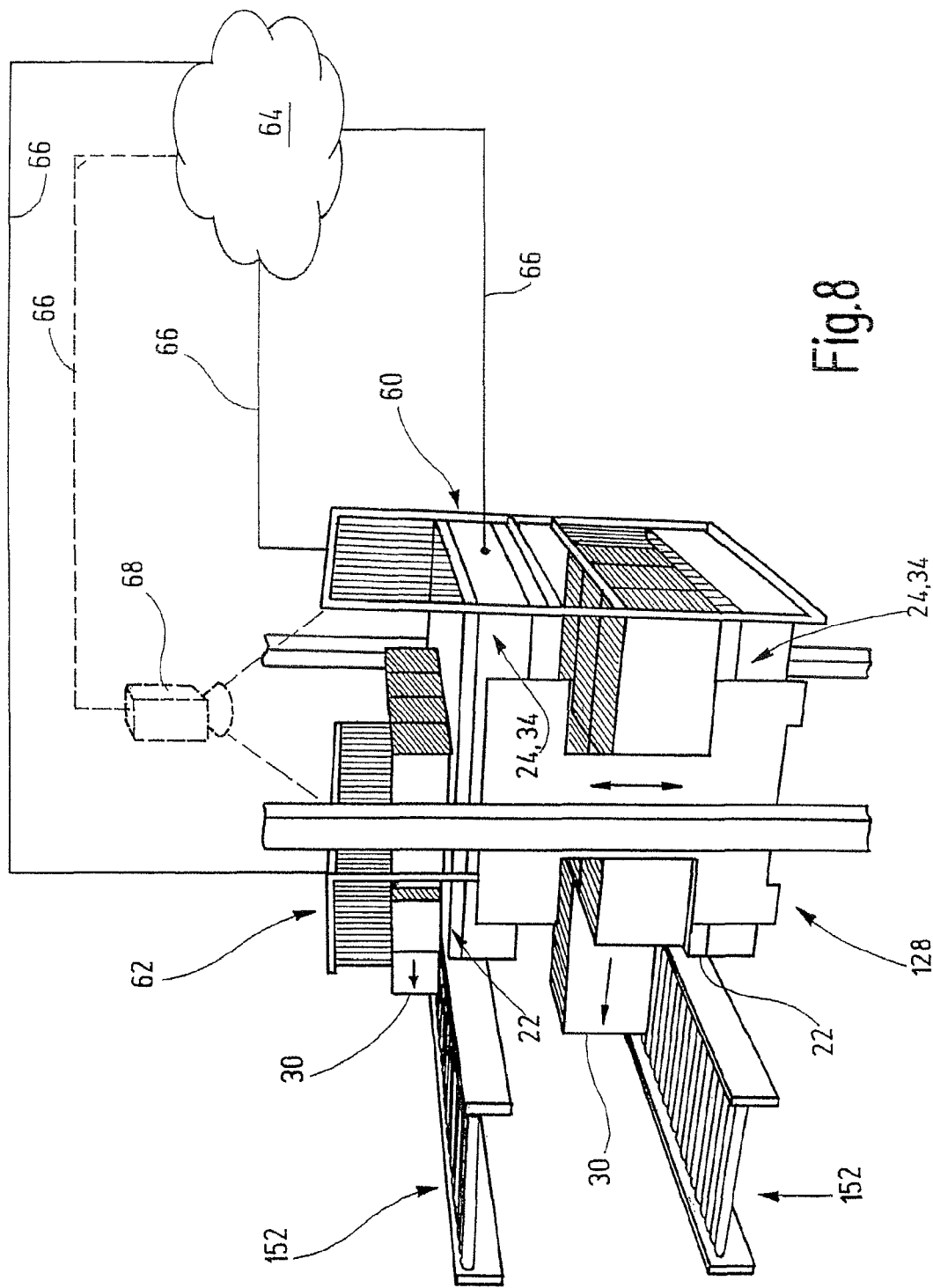

APPARATUS AND METHOD FOR UNLOADING TRAYS HAVING A PALLET LAYER LOADED

RELATED APPLICATIONS

This is a continuation application of the co-pending international application WO 2008/022767 (PCT/EP2007/007352) filed on Aug. 21, 2007 which claims priority of the German patent application DE 10 2006 039 697.9 filed on Aug. 21, 2006 which is fully incorporated herewith by reference.

TECHNICAL FIELD

The present invention relates to an apparatus and a method for unloading load a support, particularly a tray, packed with a packing unit, particularly a pallet layer of packing units.

BACKGROUND

Hereinafter, the term "load support" is to be understood as a carrier dedicated to packing units such as pallets, containers, trays and the like. Load supports are used for generating load units and storage units, respectively. In this context, it is distinguished, in dependence on its function, between: load supports having a carrying function, such as pallets or workpiece carriers; load supports having carrying and enclosing functions, such as wire-mesh pallets or trays; as well as load supports having a carrying, enclosing, and closing function, such as a freight container.

For example, trays are employed in order to singularize packing units, which are stored in huge numbers on pallets within a high-bay warehouse, onto trays in a suitable manner, and these trays are then transported to a so-called tray warehouse, where they are provided on call for processing order-picking orders. In the international logistics, a packing unit, if a piece good is provided, is also called "Kollo" (plural "Kolli"; derived from the Italian "collo"). A packing unit is the smallest unit of a shipment of goods or an order-picking order. A package including twelve milk bags being welded to each other by a film exemplarily represents a packing unit.

In logistics, piece good designates everything which can be transported in one piece, such as boxes, loaded pallets, beverage boxes, nutrition batches, housewares, etc. Liquid loadings or gases which are pumped into, for example, a transporting vehicle without their own container are not piece goods. Sand, coal, corn and comparable solids are bulk cargo or soaking goods.

The present invention is applicable to piece goods.

The German patent application DE 103 13 576 A1 (which is the priority basis of EP 1 462 394 A2) discloses an order-picking system. In the order-picking systems pallets from a pallet warehouse are singularized automatically in a known manner by means of a depalletizing means by grabbing and soaking means into single packing units. Packing units singularized in this manner are subsequently stored in a tray warehouse which serves as buffer. These trays are generally formed flat and tray-like, and preferably have a surrounding rim. The trays have holes or openings in bottoms thereof which allow passage of a lifting device for lifting an article loaded on the tray. Lifting pins of the lifting device engage with the article through the openings in the tray from beneath, and lift the article in this manner out of the tray. Consequently, a rake takes the article and pushes the article onto a horizontal loading board. Then, the lift pins can be lowered again so that the emptied tray can be transported back into the tray warehouse.

In the prior art, such rakes are also designated pushers. A pusher allows movements by which articles are transported away. As soon as an article to be pushed or transported away has reached its predetermined position, a pusher, i.e. the rake, is actuated which pushes the article towards an unloading direction.

For pushing-off the article from a conveyer track so called rotating-arm sorters are known as well.

With the known rakes and pushers a problem arises in that a tray can always only be unloaded completely. Thus, for example, it is not possible to merely push single packing units or articles off the tray. Besides that, it is not possible to transport away only particular packing units from the tray, particularly if these particular packing units are surrounded by other packing units. For this reason, all packing units are typically placed on single trays individually, which in turn represents a high performance requirement for the warehouse system.

The German laid-open patent application DE 101 27 778 A1 shows a transporting device dedicated to circuit boards which are sometimes only 35 μm thick. In order to allow the circuit boards to be transported safely, the circuit boards are put into receiving containers which are similar to a tray. These trays comprise openings allowing rollers to engage therethrough, which in turn can be lifted and lowered. The circuit boards are either transported onto the trays or from the trays by means of the rollers. Each tray serves for receiving a circuit board. One roller can be driven. Several or all rollers can be driven.

U.S. Pat. No. 3,675,801 discloses an apparatus for conveying, handling, loading, and unloading of palletized materials.

SUMMARY OF THE INVENTION

Therefore, it is an object of the present invention to provide an improved apparatus and an improved method for unloading load supports such as trays.

This task is solved in accordance with the present invention in that the apparatus for unloading a load support, particularly a tray, which can be loaded at least with one packing unit, particularly with a pallet layer of packing units, comprises a roller array and a lifting mechanism. The roller array comprises a plurality of driven rollers, and has a size which substantially corresponds to a size of a loading area of the load support. The lifting mechanism can lift the roller array, or lower the load support so that the rollers engage through holes within the loading area of the load support, in order to convey packing units from the loading area by driving the rollers.

Further, this object is solved in accordance with the present invention by a method for unloading a load support, wherein the method comprises the following steps: bringing the load support (spatially) above a roller array having a plurality of driven rollers; operating a lifting mechanism which lifts the roller array or lowers the load support such that the rollers engage through holes within the loading area of the load support so that a packing unit, which is arranged on the loading area, can be conveyed off the loading area by driving the rollers; and driving the roller for conveying the packing unit, particularly in a lateral manner, off the loading area.

The present invention is advantageous in that predetermined packing units on the load support, such as a tray, can be transported away, or unloaded in a desired manner. For this purpose, it is not required to divide a known pusher. Instead, driven rollers are provided, which preferably can be controlled individually.

If the packing units are conveyed away, merely the rollers and the ground of the packing units are in contact. Contrary to the prior art, no additional contact occurs with one of the sides of the packing unit. This is particularly interesting in cases, when packing units, which are hard to handle and which are also called "ugly ware" or "non-conveyables" by experts, have to be conveyed. Here, food being packed into cellophane paper is exemplarily described, which would be crushed and thus lose its shape, if pushed laterally as it is practised in the prior art.

In accordance with the present invention no contact with one of the sides is required for conveyance. The bottom of the packing units is not damaged neither upon conveyance since it rolls over the contact surface of the rollers, and, therefore, can not be damaged by lifting pins, as it happens in the prior art. This is particularly advantageous if the packing units are very heavy.

The force required for the conveyance can be directed directly to each individual packing unit. This measure in turn reduces the risk of damages, since the force is not exerted on individual packing units only, as it happens in the prior art, namely such which have direct contact with the pusher.

Another advantage of driven rollers is to be seen in that these rollers can be used in a reversible manner. This means that the rollers can convey into opposite directions which cannot be performed with a pusher neither.

Another advantage of the invention is that trays can be unloaded automatically. This is particularly advantageous with trays having a loading area which is as big as a loading area of a pallet. A standard dimension is here represented by the so-called Europool pallet having dimensions of 1200×800 mm. If such huge trays are unloaded, typically enormous measures were required for providing a manual work station in accordance with ergonomic regulations.

Also, the weight and the dimension of the packing unit is no longer of importance at the time of unloading, which, however, could have resulted in relatively significant problems when manually unloading.

Further, in accordance with a preferred embodiment a control device is provided for allowing aimed controlling of determined rollers of the roller array, wherein preferably each individual roller of the roller array is controllable, independent of the remaining rollers of the roller array. Alternatively, the roller array could be divided into a plurality of segments, wherein the segments also were controllable independently from each other.

These measures it is ensured that merely predetermined packing units are conveyed from the tray in a desired manner. In this context, always merely such rollers are driven which are actually needed for the conveyance, resulting in an energy saving. Other packing units do not need to be moved, as it is known for known pushers, in order to convey predetermined packing units.

In accordance with another advantageous embodiment, the lifting mechanism has a stroke allowing the package unit to be lifted high above the loading area so that the packing unit can be conveyed via a, particularly completely, surrounding limitation edge of the load support.

This measure ensures that the packing unit does not jam at the edge of the tray, and thus causes a traffic jam, and in worst case damage.

Even further, it is advantageous if the rollers of the roller array are arranged in a matrix. The matrix consists of rows and columns. The rollers are provided at locations being represented by the intersection points of lines and columns. In dependence on the size of the packing units to be conveyed away, a distance between matrix points can be determined so that very small packing units can be conveyed individually from the tray as well.

Particularly, the roller array is divided into two groups, wherein the rollers of each group are arranged in the shape of a matrix, and the matrices of the group are displaced mutually.

If the rollers of the roller array are arranged in this manner, then it is always ensured that packing units can be conveyed away, even if they are very small, and rotated or displaced relative to a specified position.

In accordance with another preferred embodiment, each roller is a flat motor roller respectively comprising a roller body having a driving motor integrated.

An integrated driving motor mainly saves space. Further, each roller can be driven individually. The drive of rows of rollers known from the prior art merely has, contrary to the present invention, allowed to drive a plurality of rollers.

Preferably, each roller body is formed cylindrically, and has a diameter of 6 to 90 mm, wherein the driving motor can have power up to 90 Watt.

Thus, the roller used with the invention is very small. Thereby it is possible that a plurality of rollers can be arranged within a narrow space. The more rollers are used, the more accurately the packing units can be directed. This means that the packing units, or the bottom thereof, may be relatively small.

Further, it is advantageous if a device for detecting a geometrical arrangement of packing units, which are located on the loading area, is provided. In this manner, it can always be determined whether the packing units are located at their specified positions. This is not always the case. The packing units can be displaced during the transport of the tray, particularly in such cases when the tray is not loaded completely any longer. The trays are subjected to high accelerations and speeds during the transport so that the inertia of mass of the packing units can cause displacement of the units during the transport of the tray. Thus, the current positions can vary from the specified positions with respect to the packing units located on the tray.

For the purpose of ensuring that the correct number of packing units is conveyed, respectively that the correct packing unit is conveyed if the tray is not loaded with articles of one sort only, a "momentary image" of the loading state is generated and transmitted to a superordinated control device such as a warehouse administration host for the purpose of an additional evaluation.

Preferably, the device for detecting a geometrical arrangement is a light grid, a position-resolving barcode scanner, a video camera, or a photo camera.

The present invention is particularly advantageous, if used with a load suspension device of a storage machine in an order-picking system. The storage machine can be a vertically movable lift or similar.

If the unloading device of the present invention is used with a vertical lift, thus the lift is no longer required to deliver the tray for unloading, i.e. the load suspension device unloads and hands over the tray to be unloaded. The packing units located on the tray—within the lift—can be unloaded directly from the lift.

This represents a significant time saving, which in turn reflects in an increase of exchange cycles which are possible at the lift.

If the process of unloading a tray from the lift lasts, for example, 4.5 seconds, since a tray having the size of a pallet has to be unloaded, thus the removal conveyance of a sequence of article units directly from the lift, i.e. without tray retrieval, lasts merely three seconds only. Hence, 1.5 seconds can be saved here. Further, the time of additional 4.5 seconds is saved, which would be required for transferring the tray into the lift again.

It is clear that this temporal advantage is not only present at a handover point from the lift to the conveyor technique or similar, but can be achieved at any handover point within the order-picking system.

With a preferred embodiment of the method, merely such rollers of the roller array are driven, which are arranged beneath the packing unit which is to be conveyed, and along a path with is passed by the packing unit itself during removal of the packing unit from the loading area.

This results in a significant energy saving, and is significantly more efficient.

Further it is preferred if a geometrical arrangement of packing units, which are located on the loading area, is detected and evaluated, in order to determine which of the rollers has to be driven for conveying the packing unit from the load area.

Particularly, only such rollers are lifted, which are needed for the removal conveyance of the packing unit.

Additionally, it is advantageous, if each roller of the roller array is rotatable about an axis perpendicularly oriented to the loading area, in order to convey the packing unit into another direction.

By this measure it is ensured that packing units can be transported away from, for example, a centre region of the loading area, although additional packing units actually lock the direct removal path.

In addition, the rollers of the roller array itself can be lifted differently high, in order to define, for example, an oblique plane, which is preferably inclined towards a direction into which the packing unit is to be removed.

With this embodiment, gravitation is additionally used for conveying the packing unit away, which results, among other things, in an energy saving.

BRIEF DESCRIPTION OF THE DRAWINGS

It is clear that the above-mentioned and hereinafter still to be explained features can not only be used in the respectively given combination but also in other combinations, or alone, without departing from the scope of the present invention.

Embodiments of the invention are depicted in the drawings and will be explained in further detail in the following description.

FIG. 4e shows an unloading device in accordance with the present invention;

FIG. 4f shows a detailed view of FIG. 4e;

FIG. 8 shows a vertical lift as used with FIG. 1, which has integrated an unloading device in accordance with the present invention.

PREFERRED EMBODIMENTS OF THE INVENTION

Figure 1:
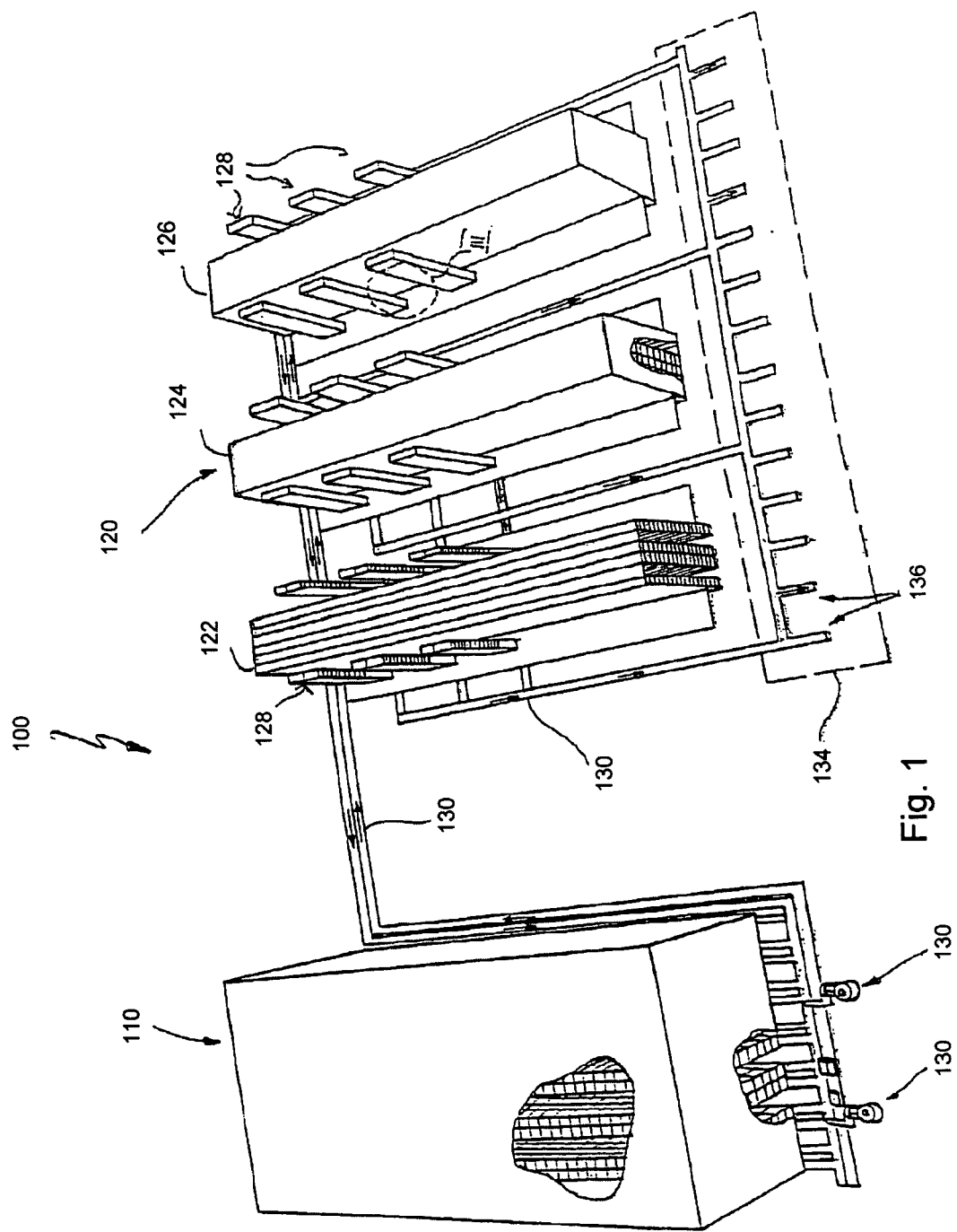
FIG. 1 shows an order-picking system.

In the description of the figures following hereinafter same elements will be designated with the same reference numerals.

The present invention relates to an apparatus and a device for unloading load supports, which are loaded with packing units. The present invention can be realized within an order-picking system in a particularly good manner, the order-picking system being better explained hereinafter with reference to FIGS. 1 to 3 in an exemplary manner. In such an order-picking system, trays are preferably loaded with one pallet layer respectively, and are brought into a tray warehouse. The stored trays are conveyed out of the tray warehouse, in order to allow processing of order-picking orders, and a corresponding number of packing units is taken from the tray in accordance with the order-picking order. This way of order-picking, by using trays being loaded with one pallet layer, is disclosed in the German application DE 10 2006 025 618 A, which is incorporated here by reference. A particular arrangement of a corresponding order-picking system is disclosed in the German patent application DE 10 2006 025 620 A, which is incorporated here by reference as well. A rack-integrated packing station, with which the present invention can be used particularly well, is disclosed in the German application DE 10 2006 025 619 which is again incorporated here by a reference. It is to be noted that all applications above origin from the inventor of the present invention.

An order-picking system 100 is shown in FIG. 1 comprising a high bay warehouse dedicated to pallets, particularly Europool pallets, and a tray warehouse 120. The tray warehouse 120 in turn comprises here three rack blocks 122, 124 and 126 serving for storing trays (not illustrated), which in turn are respectively loaded with pallet layer. The rack blocks 122, 124 and 126 are coupled to a plurality of lateral vertical lifts 128 used for storing and retrieving the trays.

Pallets (not illustrated), which are coming-in from the high bay warehouse 110, are fed to a depalletizing machine 130 which loads the pallets in a layerwise manner onto trays. Empty and loaded trays as well as other load supports are transported, by using a conveyor technique 130 such as roller conveyors, belt conveyors, etc., between the individual elements of the order-picking system 100.

The order-picking system 100 further comprises, beside the high-bay warehouse 110, a shipping area 134 which is surrounded by a dotted line in FIG. 1 and comprises a plurality of shipping stations 136.

Figure 2:
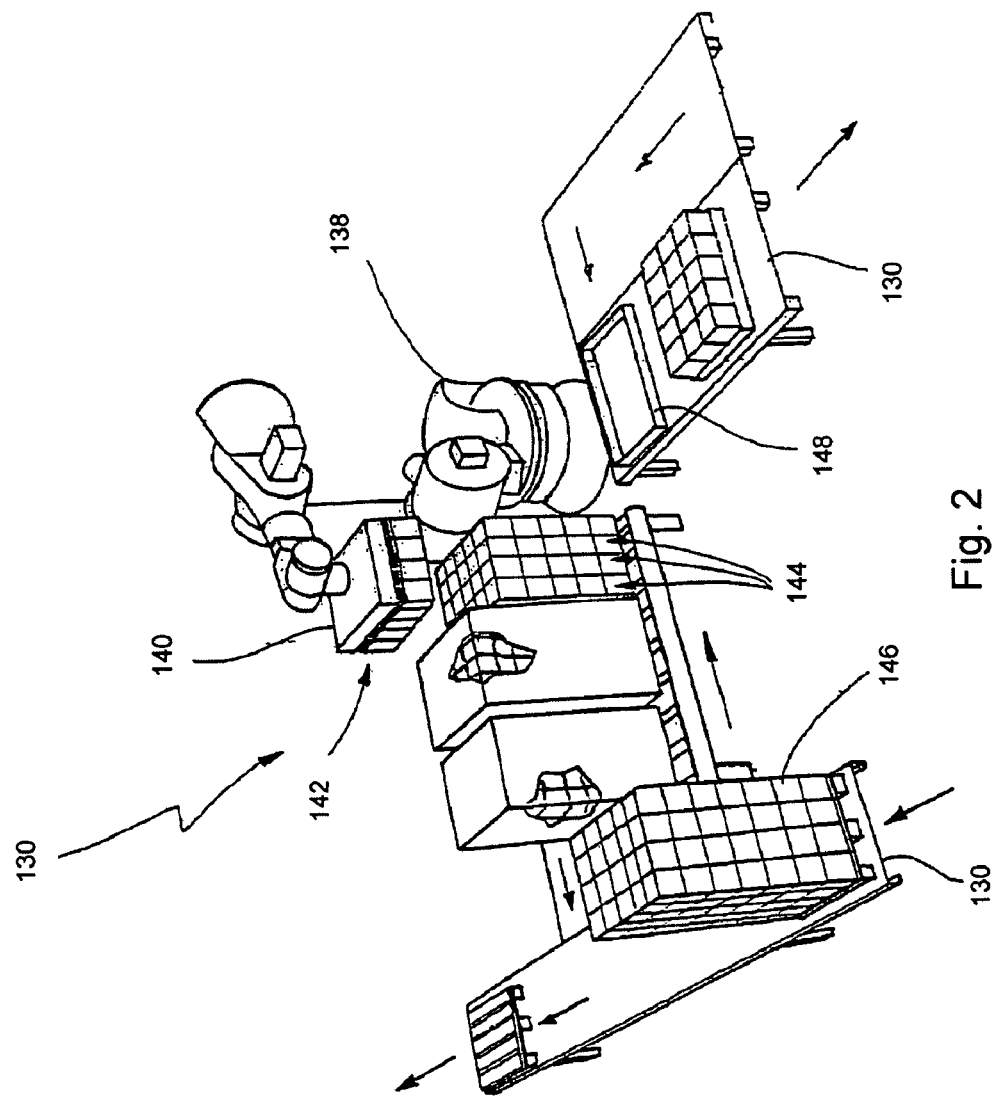
FIG. 2 shows a depalletizing device.

With reference to FIG. 2 a depalletizing machine 130 in accordance with FIG. 1 is shown in more detail.

The depalletizing machine 130 comprises a depalletizing robot 138 which loads pallet layers 142, consisting of several packing units 144, from loaded pallets 146 onto empty trays 148, for example, by using its grabbing arm having a soaking device. The pallet 146 (completely loaded and/or partially loaded) and the trays 148 are both transported by the aid of the conveyor technique 130 from and to the respective location, particularly the tray warehouse, in the order-picking system 100. This transport is schematically illustrated in FIG. 2 by arrows.

Figure 3:
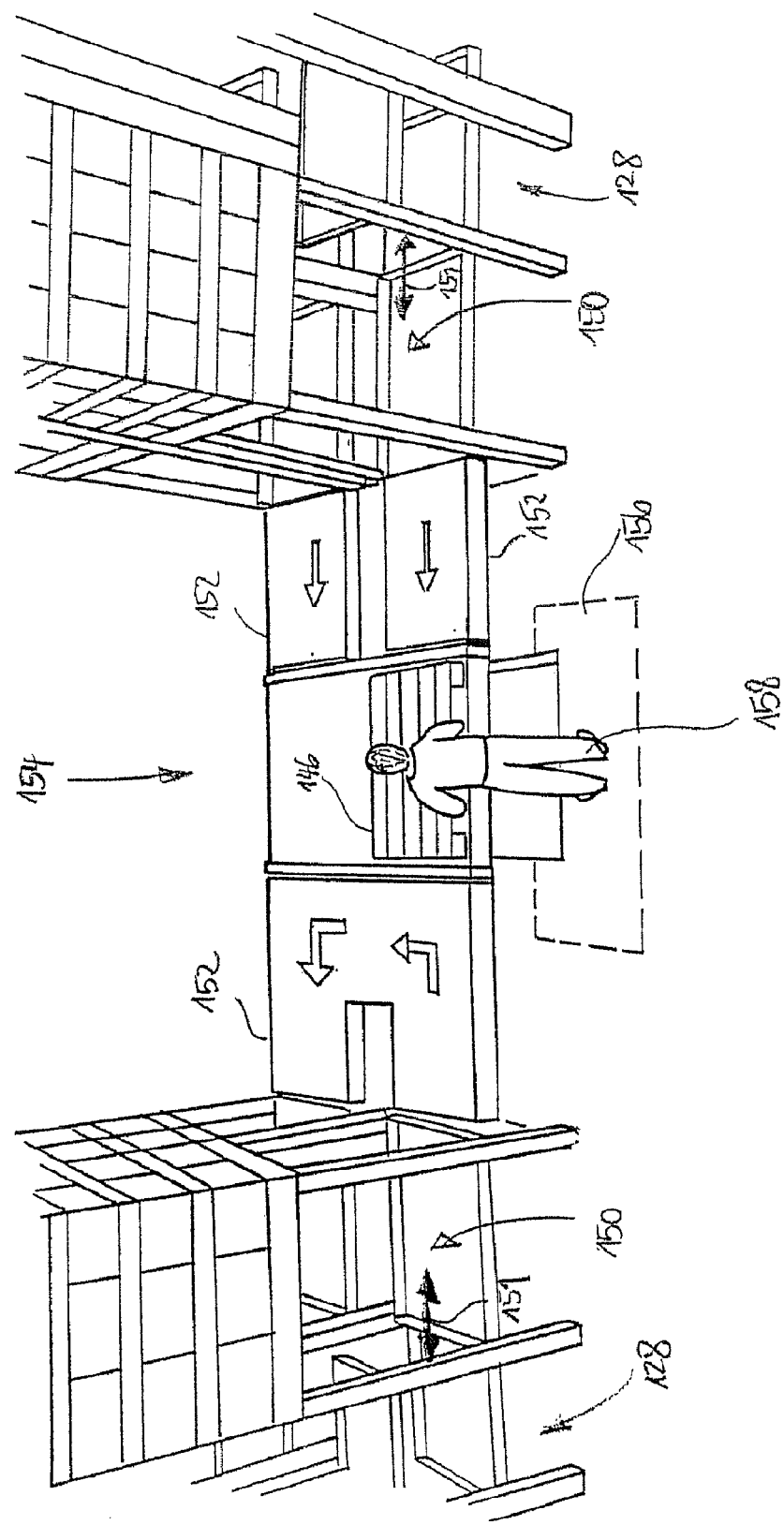
FIG. 3 shows a station for order-picking and packing which can use the present invention.

With reference to FIG. 3 a rack-integrated order-picking station is schematically illustrated, which is arranged, for example, within a circle designated by III in FIG. 1 and which is assembled in accordance with the above-mentioned patent application.

At the outer left and right of FIG. 3 lateral lifts 128 are depicted. Unloading zones 150 are shown laterally adjacent to the lifts and were previously needed for (manually) receiving trays coming out of the lift and forwarding same to a conveyor technique 152, in order to allow packing units to be picked at a packing station 154 within an work area 156 by a packer, and to be packed on a pallet 146. For this purpose, the packing station 154 is arranged between two lateral lifts.

As will be described in more detail hereinafter, now, in accordance with the invention, the tray is not unloaded from the lift 128 any longer, but merely the packing units located on the tray are unloaded from the tray, which in turn remains in the lift 128. The packing units unloaded can then be transported, for example, via the conveyor technique 152 to the order picker 158. Thus, the order picker 158 does not need to unload the tray manually any more, which was sometimes very exhausting, not to say impossible, due to the huge possible dimensions (1200×800 mm). With the aid of the present invention packing units can now be unloaded automated, which is on the one hand ergonomically more efficient and on the other hand also significantly faster.

Figure 4D:
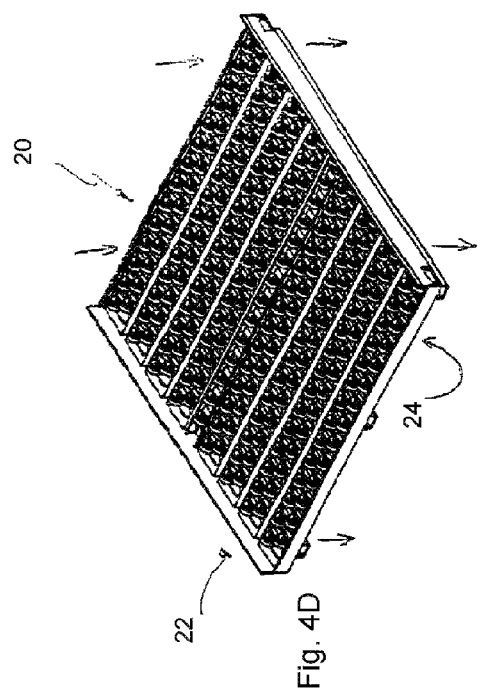
FIG. 4d shows the configuration of FIG. 4c in a lowered state.
Figure 4C:
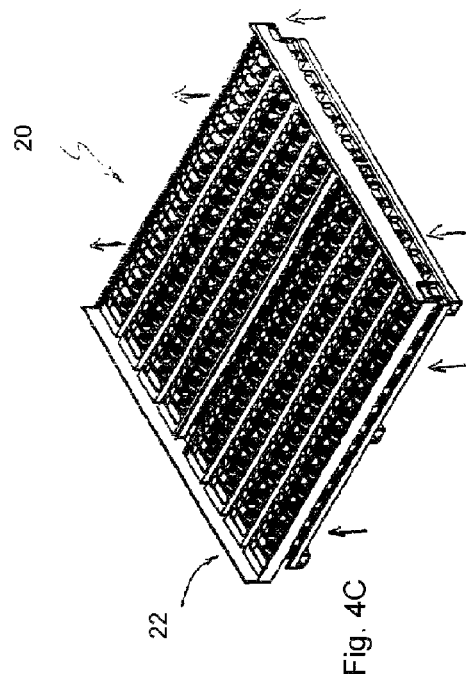
FIG. 4c shows the tray of FIG. 4a and the roller array of FIG. 4b in a lifted state.
Figure 4A:
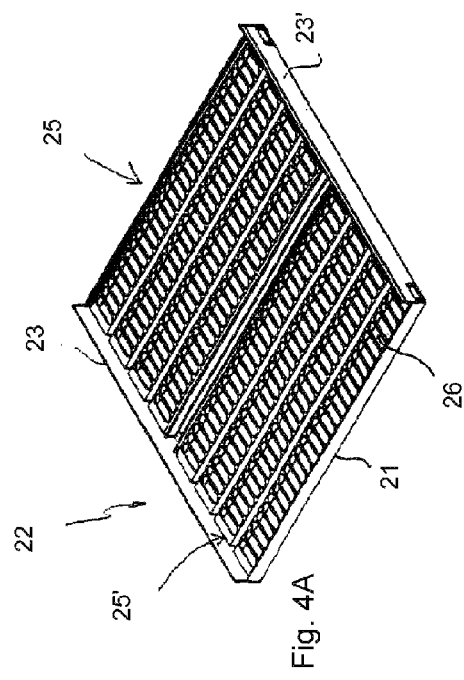
FIG. 4a shows a schematic perspective view of a tray.
Figure 4B:
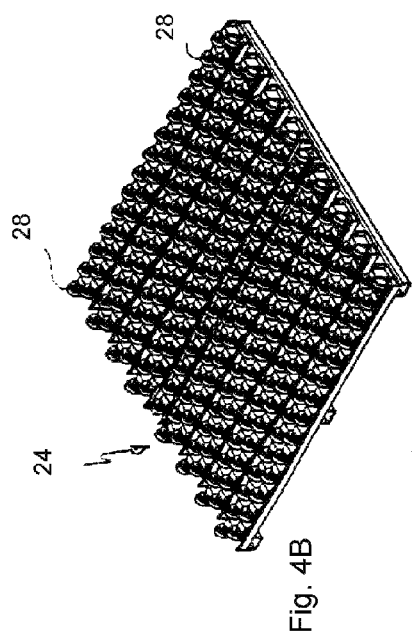
FIG. 4b shows a roller array in accordance with the present invention.

In FIG. 4a-4d components of the unloading device 20 in accordance with the invention are shown individually and commonly in different states by means of schematically perspective views. FIG. 4a shows a tray 22 alone, FIG. 4b shows a roller array 24 alone, FIG. 4c shows the tray 22 in a state when lifted over the roller array 24, and FIG. 4d shows a lowered state.

The unloading device 20 comprises a roller array 24. The roller array 24 consists of a plurality of rollers 28, which are clearly recognizable in the detailed view of FIGS. 4b and 4f.

Further, in FIG. 4a a tray 22 is shown. The tray 22 comprises a plurality of holes 26 the number of which corresponds at least to a number of rollers 28 of the roller array 24 (cf. FIG. 4c or 4f). The tray preferably comprises a frame 21. The frame 21 can comprise two oppositely arranged side walls 23, 23', which extend transversally relative to a profile, which is trapezoid-shaped, of a one-piece or multiple piece inlay sheet 25, 25'. In the example of FIG. 4 a two-piece inlay sheet 25, 25' is exemplarily shown. Therefore, the frame 21 preferably comprises three longitudinal struts defining lateral longitudinal edges of the tray 22, and a third longitudinal strut (not shown), which is arranged centrally between the outer struts in order to make the tray 22 wrap resistant.

The trapezoid-shaped profile of the inlay sheets 25, 25' increases the admissible total load capacity of the tray 22 in comparison with a tray having flat inlay sheets.

Lift forks (not depicted) or revolving lift straps (not depicted) can be used complementarily to the rollers 28 of the roller array 24. The lift forks or lift straps then extend in the longitudinal direction of the tray. They are longitudinally driven into the valleys of the trapezoid-shaped inlay sheet, or the tray is correspondingly driven therein. In this case, the side walls 23, 23' can be omitted which normally prevent the article units from sliding off the tray. The lift forks and/or lift straps, and heavy packing units can be removed. For this purpose, preferably additional conveying means are arranged on the lift forks and lift straps, respectively.

The FIGS. 4e and 4f show a state in which the roller array 24 was either lifted, or the tray 22 was lowered, so that the rollers 28 engage through the openings 26. The lowering or lifting happens towards a direction which is substantially perpendicular to the loading area of the tray 22. The loading area of the tray 22 is substantially parallel with respect to an area of the roller field 24 on which the rollers 28 are arranged and mounted, respectively.

The unloading device 20 further comprises a lifting mechanism causing the relative motion between the tray 22 and the roller array 24 at the time of lowering or lifting.

It is clear that the roller array 24 must be driven out of the openings 26 for replacing the tray 22 for the purpose of another unloading process. This will be described in more detail below.

Flat motor rollers can be used as rollers 28, such as offered by the company MAXONMOTOR. These motors are brushless, and are delivered with a roller diameter of 6 to 90 mm. In this context, each roller contains its own driving motor. This attribute is particularly advantageous if each individual roller 28 is to be controlled individually. An external driving aggregate is not required so that the unloading device of the present invention is constructed relatively short. Thus, integration into, for example, a load suspension device, such as used in the vertical lifts 128, is possible without any problem.

Further, FIG. 4 clearly shows that a first group of rollers 28 is present, which is arranged at the left-hand edge of the openings 26. This arrangement is matrix-like or grid-like. A second group of rollers 28 is arranged at the right-hand edge of neighbouring openings 26. This second group is also matrix-like arranged. The two matrices of the first and second groups are mutually displaced. This measure ensures that the packing units having very small base areas can be transported safely by the tray 22.

With reference to FIG. 5a to 5d such a transport of packing units 30 is exemplarily shown.

Figure 5:
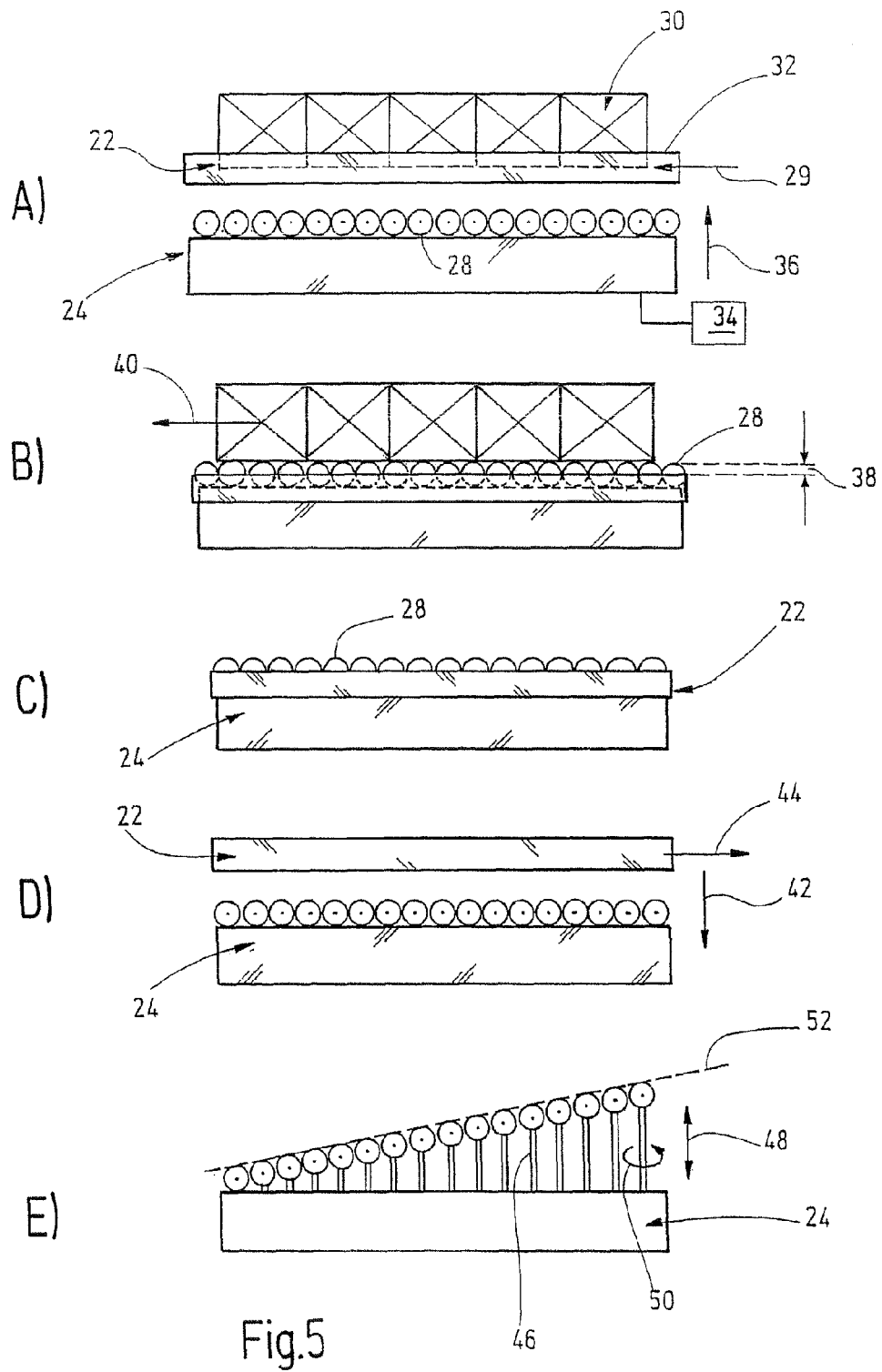
FIG. 5a-5d show an unloading process in accordance with the present invention using the unloading device in accordance with the present invention.
FIG. 5e shows a side view of another embodiment of an unloading device in accordance with the present invention.

In FIG. 5a a tray 22 is shown in a side view, the tray being loaded with a plurality of packing units 30. The packing units 30 are lowered relative to the revolving edge 32 of the tray 22. In this manner the packing units 30 are prevented from sliding off the tray 22, particularly during delivery of the tray 22, as indicated by an arrow 29.

Further, the roller array 24 is shown with a plurality of rollers 28 in FIG. 5a. With this embodiment of the invention, the roller array 24 is connected to a lift mechanism 34 so that the roller array 24 is lifted towards the tray 22, as indicated by an arrow 36.

In FIG. 5b, the roller array 24 is shown in a lifted state. The rollers 28 have passed the holes 26 (cf. FIG. 4b), and lift the packing units 30 up so that the packing units project over the edge 32 of the tray 22. This is schematically indicated by a distance 38 in FIG. 5b. The stroke of the lifting mechanism 34 is adapted correspondingly.

The packing units 30 can now be transported in a direction 40.

FIG. 5c shows a state in which the packing units 30 are transported away. The roller array 24 and the rollers 28, respectively, still project from the holes in the loading area of the tray 22.

FIG. 5d shows the roller array 24 in a lowered state, as indicated by an arrow 42. The tray 42 can be transported away towards 44, and replaced by a new loaded tray.

It is clear that, as an alternative to the lifting and lowering of the roller array 24, the tray 22 could also be lowered and lifted, in order to lift the packing units 30 for removal thereof.

In FIG. 5e another embodiment of the unloading device is shown in a side view, similar to FIG. 5a through 5d. The roller array of FIG. 5e distinguishes from the roller array 24 of FIG. 4a through 4d in that the rollers are respectively connected with their own lift device 46, in order to allow each roller to be lifted and lowered differently along a lifting direction 48. The lifting direction 48 preferably extends perpendicular to the loading area of the tray, if the tray was driven over the roller array, as it is exemplarily shown in FIG. 5*a*.

Since each individual roller 28 in FIG. 5*e* can be lifted up differently, an oblique plane 52 can be formed, which is inclined to the lower left of FIG. 5*e*. Assuming that the packing units are to be conveyed to the left, as it is exemplarily indicated in FIG. 5*b*, then the oblique plane 52 supports the removal due to the occurring downhill-slope force.

Further, the rollers can also be rotated—independent of the fact whether they can be additionally lifted and lowered individually—as indicated by an arrow 50. This rotation will be explained in more detail in the context of FIG. 7*e*. Nevertheless the rotation angle is arbitrary.

Figure 6:
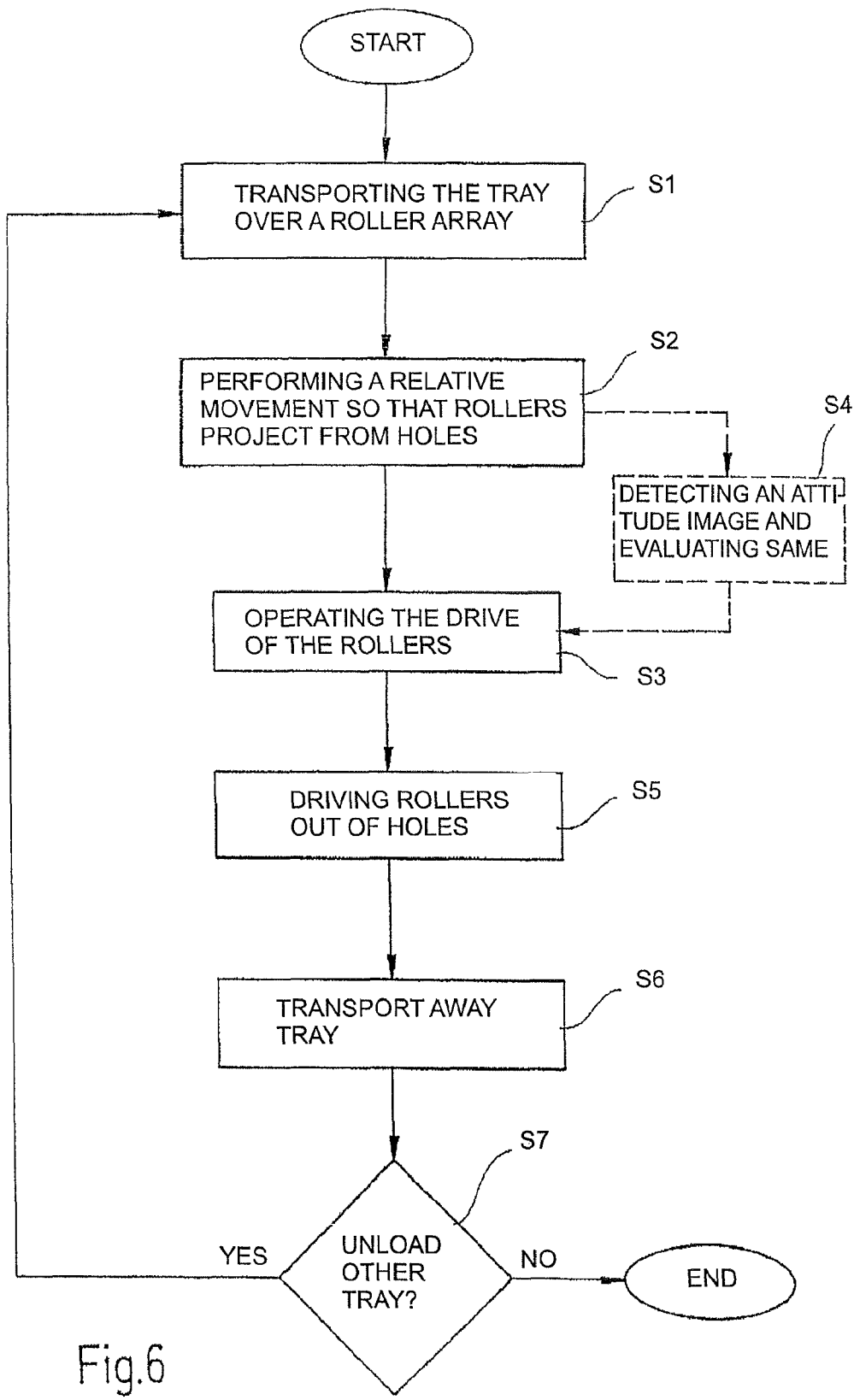
FIG. 6 shows a flow chart for illustrating an unloading device in accordance with the present invention.

FIG. 6 exemplarily shows a flow chart indicating the steps of the unloading process in accordance with the present invention.

The tray is moved over the roller array in a first step S1. In a second step S2, the tray is lowered or the roller array is lifted such that the rollers project from the holes of the tray. Subsequently, such rollers of the roller array are operated in a step S3, which are needed for causing conveyance of a specific packing unit along a removal path from the tray. Alternatively, a layer of packing units located on the tray can be detected beforehand, and can be evaluated for considering displacements of the packing units on the tray.

For example, after having removed all desired packing units from the tray, the rollers are again lifted through of the holes in a step S5 by lifting the tray or lowering the roller array. Partially unloaded trays can be returned to the tray warehouse for the purpose of a new retrieval.

In a step S6, the empty or partially unloaded tray is transported away. Subsequently, in step S7, it is asked if another tray has to be unloaded. If another tray has to be unloaded, one returns to the step S1. If any other tray has to be unloaded, then the method ends.

In FIG. 7*a* through 7*h* an unloading process is schematically shown in a top view on an unloading device in accordance with the present invention.

In FIG. 7*a* a tray 22 carrying twelve packing units 30 in total is shown which are numbered by the numbers 1 through 12. It is clear that more or less packing units could be present on the tray 22. As a rule, however, a complete layer of packing units, of one sort only, of a Europool pallet is arranged on the tray 22.

FIG. 7*a* shows a state in which the tray 22 has already been driven over the roller array (cf. FIG. 5*a*). Also, the tray has already been lowered, or the roller array has been lifted (cf. FIG. 5*b*).

Now it is possible that only the packing units 1 through 4 are required for processing an order-picking order. In this instance, only the packing units 1 through 4 are removed as shown in FIG. 7*b*. For this purpose, such rollers 28 are controlled, which are located beneath the packing units 1 through 4 in FIG. 7*a*. It is clear that also other packing units could be unloaded such as only number 1, number 1 and number 2, or number 1 and 4.

Figure 7:
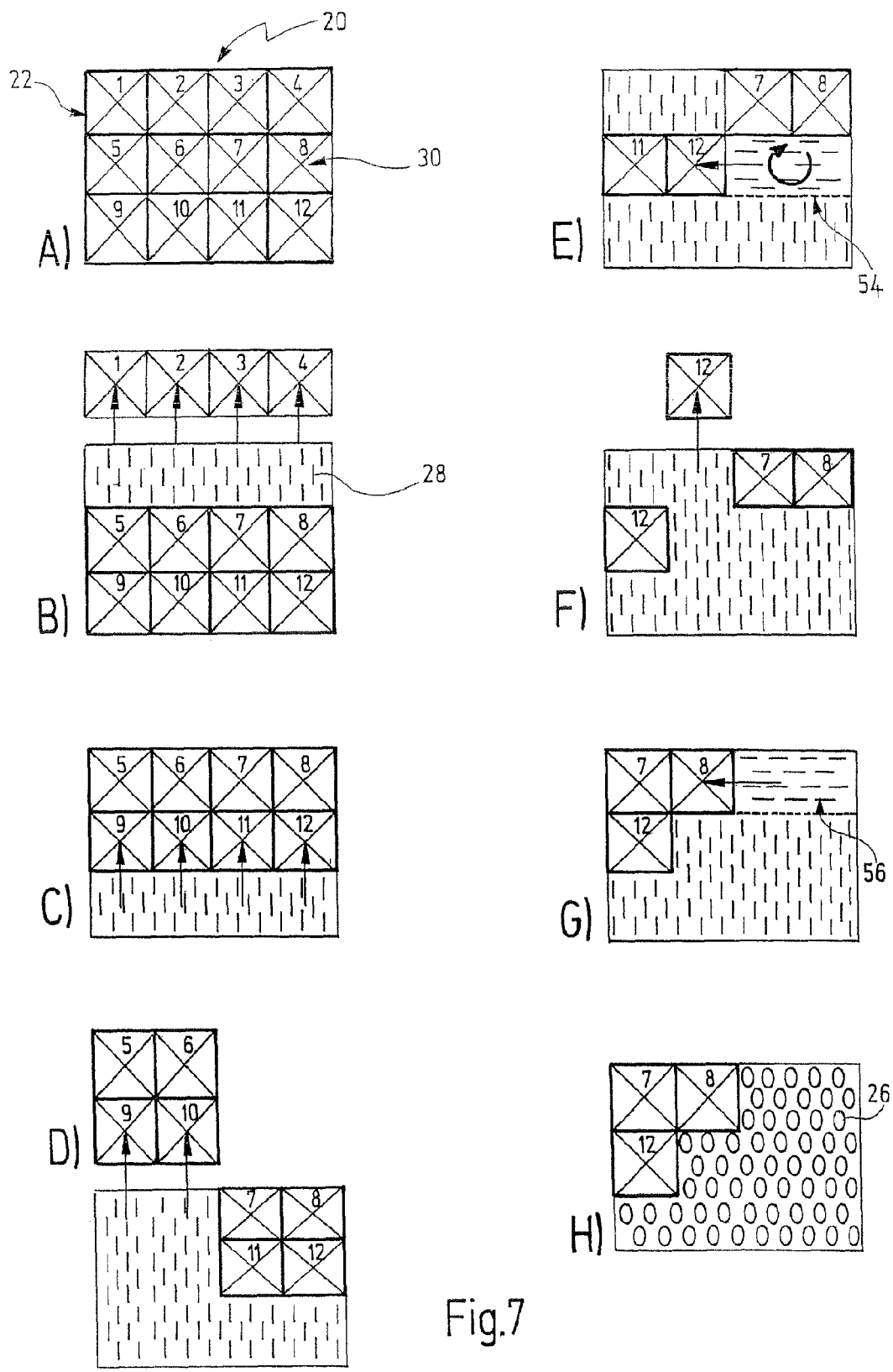
FIG. 7a-7h show an unloading device in accordance with the invention in a schematic top view, wherein packing units are removed in several steps (a-h) in a desired manner.

Subsequently, the remaining packing units 5 through 12 could be sorted or displaced, as shown exemplarily in FIG. 7*c*. However, the tray could also be transported back into the tray warehouse. Preferably, the remaining packing units located on the tray are, however, transported to the preferred unloading edge, which in FIG. 7 is represented by the upper edge of the tray. Then, these remaining packing units can be unloaded faster—due to the shorter way—at the time of the next unloading process.

It is clear that sorting is not necessarily required. Further, the tray could also be transported into the tray warehouse without sorting again the remaining packing units 5 through 12, before the tray is required again for processing an order-picking order, as described with reference to FIG. 7*d*.

In FIG. 7*d* the tray has been retrieved, for example, again for removal, or it is still located over the roller array since it was not buffered.

FIG. 7*d* illustrates a situation when the packing units 5, 6, 9 and 10 are needed for processing another order-picking order. In this case, such rollers 28 are actuated and driven, respectively, which are located beneath the packing units 5, 6, 9 and 10 in FIG. 7*c*.

Now it is possible that at the time of the next retrieval of the tray the packing unit 12 is needed for processing another order-picking order. This is depicted in FIGS. 7*e* and 7*f*, wherein here exceptionally an additional assumption was taken, namely that the packing units 1 through 12 were not of one sort only, since otherwise retrieval of the packing unit 12 would be absurd. As a rule, the packing units 1 to 12 are, however, of one sort only.

As can be taken from FIG. 7*e*, the rollers beneath the packing units 1 to 12—in comparison with FIG. 7*d*—as well as the rollers to the left have been rotated about 90° (cf. also arrow 50 in FIG. 5*e*). The packing units 11 and 12 thus can be transported to the left in FIG. 7*e* so that the packing units 7 and 8 do no longer block the packing unit 12 at the time of removal. The packing unit 12 can then be removed as shown in FIG. 7*f*.

With a preferred embodiment (not shown) the rollers of some rows or columns are slightly rotated relative to the plurality of the remaining rollers. This oblique position is chosen such that packing units resting thereon can be separated from each other easily at the time of unloading. This is particularly advantageous if the packing units are packed relatively dense and close on the tray. In this manner, besides an unloading process, simultaneously a singularization can be performed. Such rollers can stand obliquely from the beginning, or can be put obliquely in a desired manner.

It is clear that some or all of the rollers 28 can be formed rotatably. In FIG. 7*g*, the rollers beneath the packing units 7 and 8 have been rotated about 90° for conveying the packing units 7 and 8 to the left. Other rotation angles are possible.

After a removal process is terminated, the rollers are either lowered or the tray is lifted. This state is shown in FIG. 7*h*, in which the holes 26 of the tray 22 are recognizable.

FIG. 8 shows a concrete application example.

FIG. 8 shows a vertical lift 128, as used exemplarily in the tray warehouse 110 of FIG. 1. The vertical lift 128 is here provided with two receiving devices being stacked on each other for allowing receipt of respectively one tray. In the example of FIG. 8 it is assumed that the load suspension device retrieves trays from the rack (not shown) being arranged at the right-hand side of the lift 128. The packing units 30 are to be handed on a conveyor technique 152 to the left.

The roller array 24 and the lifting mechanism 34 are here respectively integrated into the load suspension device of the lift 128.

FIG. 8 shows a situation in which the load suspension device of the lift 128 is respectively loaded with one tray 22. The roller array 24 is lifted although the rollers here are not explicitly depicted. As can be seen in the upper part of the lift, the first row of packing units 30 has already been dispensed to the upper conveyer technique 152. The remaining packing units have already moved up towards the conveyor technique 152.

Further, the unloading device is here provided with a light grid 60 which detects, at the time of a transfer of the tray 22 from the rack onto the load suspension device of the lift 128, the relative attitude of the packing units 30. However, a light grid can also be mounted above the loading area of the tray. If the tray is located on the load suspension device of the vertical lift, as indicated by a device 62, then images of a loading density within the lift can be generated. Alternatively and supplementarily a video or photo camera 68 can be employed.

This attitude (i.e. position) detection devices can also be used for checking whether the "right" tray has been driven over the roller array. It is possible to check whether the right packing units are loaded on the tray. An image of the attitudes of the packing units relative to the tray can be generated. Conversely, at the time of removing, check and detection of the attitude image (attitude, amount, etc.) can be performed. In this manner, a back-storing process can also be stopped, if, for example, a packing unit projects over the edge of the tray. Thus, disturbances, jams and collisions during the (back) transport of the trays can be avoided.

It is clear that the elements 60, 62 and 68 can be provided individually or in any arbitrary combination. All of them are connected to the control unit 64, such as a warehouse administration server, via lines 66. It is clear that the lines 66 can be implemented wireless as well. The control device 64 then evaluates the detected attitude positions of the packing units on the trays, and thus determines the rollers which have to be driven within the roller arrays 24 for removing specified packing units.

In addition, the packing units could be provided with so-called RFID transponders (RFID=Radio Frequency Identification). It is clear that in this instance suitable reading devices having a sufficient spatial resolution can be employed additionally or substitute the elements 62 to 68. Usage of RFID transponders on the packing units is advantageous in that additional information can be recorded packing-unit-specifically, such as expiration date, batch number etc.

Even further, all or at least some of the rollers can also be driven by external drives additionally or permanently. This is necessary with particularly heavy packing units, if the performance of self-driven rollers such as flat motor rollers is no longer sufficient for removing the heavy packing unit. Also, some rows of rollers can be replaced by common driven rollers, which can then be switched on via a coupling, if required.

In accordance with another embodiment (not shown), an external drive such as a driven motor roller is used as described in the German patent application DE 103 36 304 A. For example, this motor roller is arranged within a row of rollers of a roller array. The motor roller is then aligned coaxially to the rollers of the roller array. Slide bearings are provided on the shell of the motor roller in a region of the rollers of the roller array including couplings, with the aid of which individual rollers of the roller array are driven by means of the driven motor roller. In a normal state, the rollers are so-called running pulleys, which can rotate freely and are not driven. Alternatively, also all rollers of the roller array can be driven in this manner, thereby allowing to save the relatively expensive flat motor rollers. Rollers of roller arrays driven in this manner can then be controlled by the aid of the coupling in a desired manner, also individually.

I claim:

1. An apparatus for unloading a load support in an order-picking system which can be loaded with a plurality of packing units, comprising:

a roller array comprising a plurality of driven rollers, and having a size which substantially corresponds to a size of a loading area of the load support; and a lifting mechanism for lifting the roller array or lowering the load support such that the rollers engage through holes in the loading area of the load support, in order to remove from the loading area a packing unit by driving the roller, wherein each individual roller of the roller array is controllable independently of the remaining rollers of the roller array.

2. The apparatus of claim 1, wherein the load support is a tray.

3. The apparatus of claim 2, wherein the tray is packed with a pallet layer of the packing units.

4. The apparatus of claim 1, further comprising a control device for controlling specific rollers of the roller array in a predetermined manner.

5. The apparatus of claim 4, wherein each roller is selectively controllable for unloading a specific packing unit of the packing units from the load support.

6. The apparatus of claim 4, wherein the roller array can be divided into a plurality of segments, and wherein the segments are controllable independently to each other.

7. The apparatus of claim 1, wherein the lifting mechanism has a stroke allowing the packing unit to be lifted up from the loading area so that the packing unit can be conveyed over a limiting rim, which is surrounding the load support.

8. The apparatus of claim 1, wherein the rollers of the roller array are arranged in a matrix.

9. The apparatus of claim 8, wherein the roller array is divided into two groups, wherein the rollers of each group are arranged in matrices, and the matrices of the groups are displaced mutually.

10. The apparatus of claim 1, wherein each roller is a flat motor roller respectively comprising a roller body having an integrated drive motor.

11. The apparatus of claim 10, wherein each roller body is formed cylindrically, and has a diameter of about 6 to 90 mm.

12. The apparatus of claim 11, wherein the driving motor has a power of up to about 90 Watt.

13. The apparatus of claim 1, wherein the rollers are driven electrically.

14. The apparatus of claim 1, further comprising a device for detecting a geometrical arrangement of the packing units located on the loading area.

15. The apparatus of claim 14, wherein the device for detecting a geometrical arrangement is selected from a group including: a light grid, a position-resolving barcode scanner, a video camera, and a photo camera connected to a control device for controlling specific rollers of the roller array in a predetermined manner.

16. A storage machine dedicated to an order-picking system for order-picking packing units in accordance with an order-picking order using at least one load suspension device, wherein each load suspension device comprises the unloading apparatus, the unloading apparatus comprising: a roller array comprising a plurality of driven rollers, and having a size which substantially corresponds to a size of a loading area of the load support; and a lifting mechanism for lifting the roller array or lowering the load support such that the rollers engage through holes in the loading area of the load support, in order to remove from the loading area a packing unit by driving the roller, wherein each individual roller of the roller array is controllable independently of the remaining rollers of the roller array.

17. The storage machine of claim 16, wherein the storage machine is selected from a group including: a vertically movable lift, a storage and retrieval device being movable substantially in a horizontal direction, and a handing-over station dedicated to load supports.

18. A method for unloading a load support within an order-picking system loaded with a plurality of packing units, having the following steps:
- transporting the load support above a roller array comprising a plurality of driven roller, wherein each roller of the roller array is controllable independently of the remaining rollers of the roller array;
- operating a lifting mechanism for lifting the roller array, or lowering the load support, such that the rollers engage through holes in a loading area of the load support so that a specified packing unit, which is arranged on the loading area, can be removed from the loading area by driving the rollers; and
- driving individual rollers for removing the specified packing unit of the packing units from the loading area.

19. The method of claim 18, wherein merely such rollers of the roller array are driven, which are arranged beneath the packing unit to be conveyed and are located along a path, which is traveled by the packing unit during removal from the loading area.

20. The method of claim 18, wherein a geometrical arrangement of packing units located on the loading area is detected and evaluated for determining which of the rollers has to be driven, in order to convey the packing unit from the loading area.

21. The method of claim 18, wherein only such rollers are lifted, which are needed for removing the packing unit.

22. The method of claim 18, wherein each roller of the roller array is rotated about an axis oriented perpendicular to the loading area, in order to convey the packing unit into a different direction.

23. The method of claim 18, wherein the rollers of the roller array are lifted up differently, in order to define an oblique plane which is preferably inclined towards a direction into which the packing unit is to be transported away.

* * * * *